United States Patent
Boyd

(10) Patent No.: US 7,716,285 B2
(45) Date of Patent: May 11, 2010

(54) LOCATION-BASED NETWORKING METHODS AND SYSTEMS FOR PERFORMING THE SAME

(75) Inventor: John Edward Boyd, New York, NY (US)

(73) Assignee: TTB Technologies, LLC, Ridgefield, CT (US)

( * ) Notice: Subject to any disclaimer, the term of this patent is extended or adjusted under 35 U.S.C. 154(b) by 0 days.

(21) Appl. No.: 12/286,565

(22) Filed: Oct. 1, 2008

(65) Prior Publication Data

US 2009/0037531 A1    Feb. 5, 2009

Related U.S. Application Data

(63) Continuation of application No. 10/886,210, filed on Jul. 7, 2004, now Pat. No. 7,483,946, which is a continuation of application No. 10/110,711, filed as application No. PCT/US01/06146 on Feb. 27, 2001, now Pat. No. 6,963,900.

(60) Provisional application No. 60/185,902, filed on Feb. 29, 2000.

(51) Int. Cl.
    *G06F 15/16*    (2006.01)
(52) U.S. Cl. .................. 709/204; 709/203; 709/217; 709/219
(58) Field of Classification Search ......... 709/200–205, 709/217–227, 228
    See application file for complete search history.

(56) References Cited

U.S. PATENT DOCUMENTS

| | | | |
|---|---|---|---|
| 4,977,520 A * | 12/1990 | McGaughey et al. | 715/753 |
| 5,093,901 A * | 3/1992 | Cree et al. | 715/753 |
| 5,129,057 A * | 7/1992 | Strope et al. | 715/833 |
| 5,459,859 A | 10/1995 | Senda | 395/600 |
| 5,796,395 A | 8/1998 | de Hond | 345/331 |
| 5,855,006 A | 12/1998 | Huemoeller et al. | 705/9 |
| 5,857,708 A | 1/1999 | Harvey | 283/67 |
| 5,913,212 A | 6/1999 | Sutcliffe et al. | 707/6 |
| 5,924,075 A | 7/1999 | Kanemitsu | 705/6 |
| 5,960,406 A | 9/1999 | Rasansky et al. | 705/9 |
| 5,963,913 A | 10/1999 | Henneuse et al. | 705/9 |
| 5,963,951 A | 10/1999 | Collins | 707/102 |
| 5,966,068 A | 10/1999 | Wicks et al. | 340/286.01 |
| 5,974,406 A | 10/1999 | Bisdikian et al. | 707/1 |
| 5,982,863 A | 11/1999 | Smiley et al. | 379/112 |
| 6,009,403 A | 12/1999 | Sato | 705/6 |
| 6,016,478 A | 1/2000 | Zhang et al. | 705/9 |
| 6,052,122 A | 4/2000 | Sutcliffe et al. | 345/331 |
| 6,061,681 A | 5/2000 | Collins | 707/5 |
| 6,073,105 A | 6/2000 | Sutcliffe et al. | 705/1 |
| 6,175,842 B1 | 1/2001 | Kirk et al. | 715/205 |
| 6,216,110 B1 | 4/2001 | Silverberg | 705/9 |
| 6,363,352 B1 * | 3/2002 | Dailey et al. | 705/9 |

(Continued)

OTHER PUBLICATIONS

Search Report dated Jun. 26, 2001 which issued in corresponding International Application PCT/US01/06146.

*Primary Examiner*—Moustafa M Meky

(57) ABSTRACT

Methods and systems for assisting individuals (101) arrange meetings such as networking meeting with other individuals (101) at a specified time (or within a specified time range) and/or at a specified place (or within a specified geographic region). More specifically, methods and systems for allowing individuals (110) to post an invitation to for a meeting on an on-line network and for allowing one or more other individuals (101) to accept such invitation.

53 Claims, 5 Drawing Sheets

U.S. PATENT DOCUMENTS

| | | | |
|---|---|---|---|
| 6,392,760 B1 | 5/2002 | Ahuja et al. | 358/400 |
| 6,636,888 B1 * | 10/2003 | Bookspan et al. | 709/203 |
| 6,963,900 B2 * | 11/2005 | Boyd | 709/204 |
| 7,284,033 B2 | 10/2007 | Jhanji | 709/206 |

* cited by examiner

LOCATION-BASED NETWORKING METHODS AND SYSTEMS FOR PERFORMING THE SAME

RELATED APPLICATION DATA

This application is a continuation of U.S. application Ser. No. 10/886,210, filed Jul. 7, 2004, which is a continuation of U.S. application Ser. No. 10/110,711, filed Apr. 11, 2002, which issued as U.S. Pat. No. 6,963,900, which is a national stage application under 35 U.S.C. Section 371 of PCT International Application No. PCT/US01/06146, filed Feb. 27, 2001, which claims priority to Provisional Patent Application Ser. No. 60/185,902, filed Feb. 29, 2000, each hereby incorporated by reference.

BACKGROUND OF THE INVENTION

1. Field of the Invention

The present invention relates an on-line and/or wireless system and method for facilitating the arrangement of networking meetings between two or more individuals. More specifically, the invention relates to providing a system and method for allowing communications between two or more parties relating to the scheduling and arrangement of a meeting between the two or more parties.

2. Description of the Related Art

Several publications are referenced in this application. The references describe the state of the art to which this invention pertains and are hereby incorporated by reference.

Today's worker often finds him or herself with more to do, with less time. The pressures of work, family, social obligations and time for leisure activities combine to transform the average individual's daily or weekly schedule into one which is overloaded with commitments. Yet for some individuals, particularly business travelers, there are periods of time when one finds oneself with time to fill—"down time". For example, the business traveler often shuttles from city to city for meetings and the like. When the meetings in a particular city are over and/or delays caused by travel disruptions, the business traveler often finds himself or herself with a considerable amount of free time before the next meeting or the next leg of the business trip. There may be an evening during a business trip or morning where the individual has a block of time for relaxing, catching up on work, etc. Although these periods are sometimes a welcome breather from the daily grind, they can typically seem like lost opportunities or wasted time. If "catching up" on the work doesn't require much time, the business traveler may find an entire evening free of obligations in a city far from home. Currently, this time may be spent eating a dinner alone in the hotel's restaurant, eating alone in the room using room service or other solitary activities.

Today, there is a heightened awareness of the value of time and the importance of utilizing one's time efficiently to maximize one's professional and personal endeavors. It would be desirable to provide a service for such individuals which enables them to better utilize "down time" in a highly constructive manner.

Although there are products and services such as television, movies, etc. which provide a form of entertainment during "down time", these products and services do not necessarily provide the individual with the human interaction with others that can make an evening or other period of time rewarding in both the professional and personal sense.

Although not geared to the business traveler or to optimizing "down time", dating services are gaining popularity as more and more people do not have the time or opportunity to meet potential dates. Many individuals who have been displaced from a network of family and/or friends sometimes find themselves bored with the "bar scene" and have not had much luck with "blind dates." There are several existing computer-based methods and systems directed to providing dating services. Initially, most dating services were provided by mail or over the telephone where participants would input their personal characteristics (e.g., gender, sexual orientation, age, geographic location, etc.) and their preferences for a date (e.g., gender, age, etc.). As the use of the Internet has become more popular, many systems and methods were developed for providing dating services on-line.

For example, U.S. Pat. No. 5,963,951 to Collins relates to a computer-implemented dating service, and more particularly, to a method, system and apparatus for real-time, on-line computer searching and matching of database entries based on location and user-selectable search criteria. The system provides user-controlled perusal of the on-line dating search results. A database of subscriber information is searched to find at least one subscriber matching user search criteria. The subscriber information includes preferences of subscribers to the service. Both the personal preferences and the subscriber information include at least: a gender preference; a geographic location preference; a geographic location preference; an age preference; appearance preferences; religious belief preferences; educational level preferences; and a goal preference, wherein the goal preference is one of "romance"; "friendship" or "a walk on the wild side", wherein the geographic location preference is at least one of a postal code, a country, a city, a suburb, a block, or a street. The subscriber information includes a date of last payment of a use fee by each subscriber and a date of last updating of a personal profile by each subscriber. First the system locates, from the database, all valid subscribers whose gender preferences matches the required gender preference and who are located "nearby" the given postal (zip) code. Then, for each subscriber found in the first step, the system also retrieves the user's system information such as user name, phone number and geographic location. Next, for each subscriber retrieved (who matched the gender and geographic location criteria), the system determines a score based on the subscriber's input information, the subscriber's preferences and the user's input and preferences. The list of matching subscribers is then sorted in descending order by "score", then in ascending order by zip code and then in descending order of last access and/or payment.

Thus, the system and method of Collins provides an on-line dating service which matches subscribers with other subscribers for possible dating. Such a system would be unsuitable for providing an on-line networking system for arranging meetings such as dinner meetings at a specified time and place. The on-line dating service of Collin would not, for example, enable an individual to better utilize "down time" which occurs as a result of a layover at a particular city on a business trip. Or for an individual at home who has just had their evening plans cancelled but would still like to meet with other individuals for dinner, a drink or the like. See also, U.S. Pat. No. 5,796,395 to de Honda.

Moreover, a "dating service" is not always an acceptable alternative of the individual. First, the individual may not be interested in a date in the romantic sense. Such dating services are geared to matching people together in a romantic sense. For individuals who are married, for example, the "dating services" currently offered do not offer an attractive choice for better utilizing their down time. Second, many people feel a stigma is associated with seeking and/or finding a "significant other" using a dating service. Furthermore, such services typically first match the individuals and then the individuals, if willing, communicate via email and/or telephone to learn more about each other. Such systems are not suitable for setting up a networking meeting at a particular time and place.

Finally, such services are not primarily geared to helping an individual promote oneself through "networking" with other individuals. Business "networking" has become an integral part of many professions. Individuals spend a considerable amount of time going to conferences, joining social clubs and professional associations to meet and network with other business people to further their professional aspirations. Professional conferences, although primarily planned to provide lectures and discussion roundtables, almost always include "networking" functions such as luncheons or cocktail receptions to allow participants to network with each other and "exchange business cards". For some professionals, such as salespeople, a considerable amount of their "work" includes simply networking with other individuals in the hopes of creating business contacts and/or product/service customers.

Another good indication of the importance of "networking" are the number of social clubs offered to individuals and the amount of money individuals will pay to join such clubs. In the City of New York, there are a variety of social clubs that offer opportunities to network with other members. Such clubs include university alumni clubs such as the Yale Club or the Harvard Club and non-alumni clubs such as the New York Yacht Club and Union Club. However, not all members of such clubs join to "networking" purposes. Many join because of the fine amenities offered including dining services and overnight accommodations. A recent article illustrated the possible friction between members attempting to network with non-interested members: "The oh-so-proper Harvard Club of New York is polling members about a proposal that they wear an 'H' pin in their labels to signify a willingness to socialize while at the club. Seems certain members resent unsolicited efforts of others to network". *Forbes*, "How about $ for $tuff", Jan. 24, 2000.

Private social clubs have in the past provided "communal tables" in the club's dining facilities. This would allow members of the club, who are dining alone, to sit together and thereby interact. Since all those at the table were members of the same club, each shared at least some common interests. Recently, an increasing number of restaurants are offering seating at "communal tables" which allow strangers to dine together. "The Nearness of.... Who?" by Jennifer Tung, *New York Times*, Feb. 20, 2000. Such tables offer diners the opportunity to dine with others rather than dine alone. However, ironically, the attractiveness of such public "communal tables", the diversity of individuals who may participate, is also one of its drawbacks. More specifically, it is difficult to predict who will be seated next to who. Since individuals can have a wide variety of interests and backgrounds, the "communal table" does not always result in the most desirable dining experience for all those participating. Moreover, not all restaurants, in fact very few, offer such seating arrangements.

Thus, although there is a great deal of opportunities to "network", it is sometimes difficult to determine the who's, where's and when of networking. Although some events sponsored by social clubs or associations are clearly intended for networking, and thus all participants are willing to network, the timing of such events are typically outside the control of individuals. An individual is unable, for example, to attend such an event on a particular business trip layover in Chicago. Therefore, it would be desirable to provide an improved method and system for networking since, today, career advancement may rely not only on working hard and keeping abreast of the latest developments in one's field, but also professionally networking with others in a variety of business settings such as conferences and the like.

U.S. Pat. No. 5,459,859 to Senda provides an information providing apparatus and system for providing registered subscribers with information required for meeting with desired people while traveling. The apparatus includes attribute/schedule storing means for storing for each subscriber, attribute data and schedule data of a subscriber, and attribute data of a person expected to meet, subscriber selecting means for selecting a specific subscriber having common attribute data and common schedule data among subscribers by reference to the attribute/schedule storing means, information accumulating means for accumulating information as to the expected person for each subscriber selected by the subscriber selecting means, and information providing means for providing subscribers via a communication network with the information accumulated by the information accumulating means. In operation, the attribute data and schedule data of a subscriber and the attribute data of an expected person are stored in advance in attribute/schedule storing means for each subscriber who expects to meet with a desired person while traveling. The subscriber selecting means selects a specific subscriber having common attribute data and common schedule data among subscribers by referring to the attribute/schedule storing means. The drawback of the system of this system is that it generates information regarding the other party who the subscriber can meet with. The system does not allow for "two-way" arranging and scheduling which would allow for a more synergistic networking. The system of Senda is analogous to the system of Collin except Senda includes "travel schedule data" in the preference information and the system generates a list of possible matches based on the attribute data of a desired person and the travel schedule data. The system fails to provide individuals with a flexible and dynamic system for networking. Although the system provides information required for meeting with a desired person while traveling, it is the system that "selects a specific subscriber having common attribute data and common schedule data among subscribers by referring to the attribute/schedule storing means". This is disadvantageous since the parties participating in the service are "matched" by the system, rather then by themselves.

Thus, it would be desirable to provide an improved system and method which overcomes the above described disadvantages. More specifically, it would be desirable to provide a method and system which provides personalized, dynamic interactive means which allows individuals to schedule a time and place for a meeting for the purpose of business or personal networking.

OBJECTS OF THE INVENTION

It is an object of the invention to overcome the above-identified deficiencies.

It is another object of the invention to provide an on-line method and system which allows for personalized, interactive and dynamic assistance in arranging networking meetings.

It is a further object of the invention to provide a method and system which provides a user with the ability to facilitate the arrangement of networking meetings such as dinners, golf outings and the like.

It is a still further object of the invention to provide a method and system which facilitates the development of a user's business and professional associations.

It is a still further object of the invention to provide a system and method which allows one or more individuals to advertise invitations for networking meetings which may be reviewed and/or accepted by one or more individuals.

The foregoing and other objects and advantages of the invention will be set forth in or apparent from the following description.

SUMMARY OF THE INVENTION

The present invention relates to a system and method that allows individuals to meet and network with other individuals at a specified time and place. According to the invention, a first user "posts" an invitation for a meeting which includes a proposed time (or time range) and place for the meeting and, if desired, any preferences or criteria such as who the first user is interested in meeting with (e.g., a computer scientist, an attorney, a resident from a particular city, alumni from a particular college, etc.).

For example, one preferred embodiment of the invention relates to a system and method which allows an individual to "post" an invitation to meet at a proposed time and location. The invitation may be accessible by other users on an on-line bulletin board, for example. The "invitation" is reviewed by such users. When one or more users "accepts" the "invitation", a meeting may be established.

Providing an interactive, dynamic system and method for networking would be a valuable service for those individuals who wish to make "down time" on business trips or at home both productive and interesting. A stated above, business travelers and other individuals often find themselves with "down time" or "dead time" (e.g., a block of time with no plans) and/or a desire to meet with a particular type of individual at a specified time and place. For example, at the end of any given day during a business trip, a traveling professional usually has one of two options: (a) do more work or (b) go back to his hotel room for dinner. The inventive systems and methods will provide a more enjoyable, productive alternative: join other traveling or nontraveling professionals for "networking" dinners or other meeting anywhere in the world. Rather than eat alone in a restaurant, at home, or in a hotel room in front of a television, the user may be able to take part in a stimulating, productive meeting with other like-minded individuals.

Thus, one aspect of the invention is to provide a method and apparatus which enables a user to advertise an invitation to a proposed meeting such as a dinner meeting, a golf outing, or other networking event on a computer network, such as the Internet, to directly or indirectly receive acceptances from prospective individual users.

It is a further aspect of the invention to provide a method and apparatus which enables a plurality if inviting users to advertise invitations at a single location which is readily updated, such as a Web page or bulletin board, and accessible via a computer network, such as the Internet.

It is still further aspect of the invention to provide a method and apparatus which enables users seeking invitations to access information relating to one or more invitations posted by inviting users via a computer network.

It is still further aspect of the invention to provide a method and apparatus which enables users seeking such invitations to access information relating to one or more invitations posted by inviting users via a computer network. According to one embodiment, the system may disconnect the user from the single location while enabling the user to communicate directly with the inviting user via the computer network when the user accepts the invitation advertised by the inviting user.

According to one preferred embodiment, the invention enables a plurality if inviting users to advertise or post invitations at a single location, such as a Web page or bulletin board, accessible via a computer network, such as the Internet, and also enables users seeking invitations to access information relating to one or more invitations posted by inviting users via a computer network. This is achieved by providing a software program, recorded on a computer readable medium, for controlling a computer of an inviting user to generate the invitation that can be accessed via the Internet. More specifically, the software program is adaptable to be run by a user's computer to control the computer to generate a computer readable file (invitation file) that includes information pertaining to the invitation and which can be accessed from a remote site via the Internet. For example, the invitation file can be posted as a Web site on the World Wide Web. A user seeking an invitation can access the Web site and search the information in one or more posted invitations for a desired invitation. Also, a portion of the invitation file can be uploaded to a remote Web site that is hosted by the remote computer. Invitation seekers can access the remote Web site and search the uploaded portion of the invitation file for a desired invitation. For example, the uploaded portion of the invitation file may include the time and location (e.g, city, neighborhood, restaurant, etc.), whereas the remaining portion of the invitation file includes information such as food preference or any other criteria. The remote computer is also preferably capable of automatically searching the uploaded portion of the invitation files for data that matches date provided by and/or criteria of the user. For example, an invitation seeker may wish to review all invitations posted for dinner meetings in Dallas on a particular evening. The user may further limit the invitations to one or more criteria such as reviewing all such invitations seeking a dinner meeting with an intellectual property attorney(s). Preferably, the remote computer is capable of informing the invitation seeker's computer when a match is found (e.g., by an electronic message sent via the Internet, facsimile, etc.). Preferably, the invitation file preferably includes linking data which enables the invitation seeker's computer or cell phone to send an electronic message, such as an email or the like, to the inviting user's computer and vice-versa via a computer network such as the Internet or via a telephone or cellular network It is another aspect of the invention to provide a system and method which efficiently organizes and/or screens the invitations and/or acceptances for the users.

It is yet another object of the invention to provide a method and apparatus which monitors invitations for an invitation seeker and automatically notifies the invitation seeker when a invitation for which the invitation is suitable becomes available.

Other objects as well as aspects, features and advantages of the present invention will become apparent from a study of the present specification, including the drawings, claims and specific examples.

DETAILED DESCRIPTION OF THE INVENTION

Figure 1:
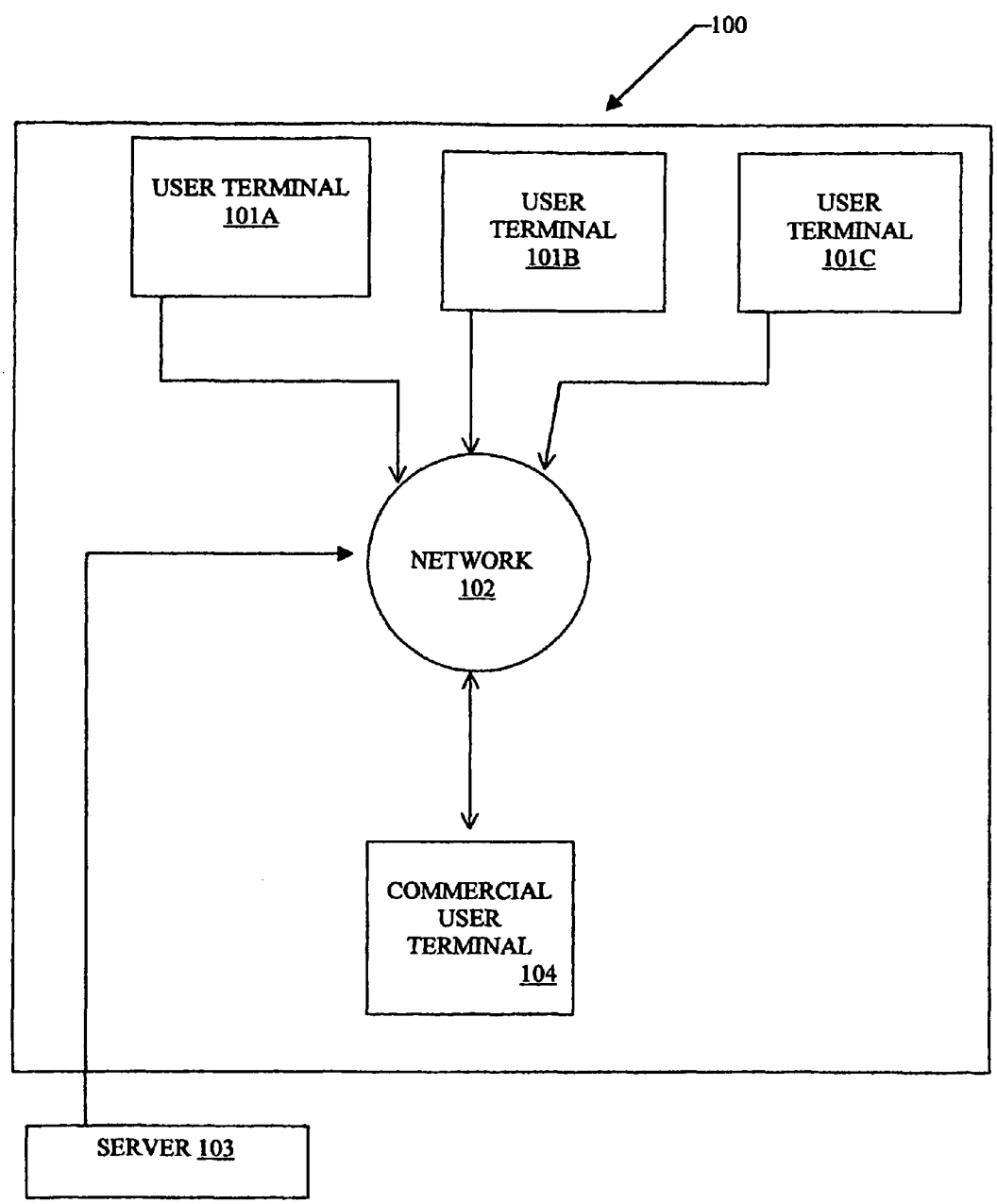
FIG. 1 illustrates a block diagram of a system according to one embodiment of the present invention.

The term "user" refers to both individuals who are posting invitations using the method and system of the invention and individuals who may accept the posted invitations. Preferably, the users a members or subscribers to a service which provides the networking systems and methods of the invention.

The term "computer devices" is intended to include a device having a digital processor or the like such as a desktop, notebook or handheld computer, electronic organizers such as the PalmPilot™, cellular telephones, personal communication devices, or the like. The inventive methods and systems are preferably employed using networked computer devices such as those linked via the Internet or capable of accessing the Internet. One preferred embodiment of the invention relates to practicing the inventive method and/or constructing the inventive system using a computerized network such as a LAN (local area network), Internet, Intranet or the like. Preferably, the invention incorporates the use of a network such as the Internet to allow an unlimited number of users to readily access the inventive service.

The term "anonymous" as used herein is intended to refer to anonymity between the two or more parties. One form of anonymity involves "shielded identity", where a trusted agent knows the identity of the two or more parties, but does not reveal that identity to others except under specified circumstances. Unless otherwise specified, the term "anonymity" is used throughout this application interchangeably with the notion of shielded identity. See, U.S. Pat. No. 6,023,510 to Epstein; U.S. Pat. No. 5,884,272 to Walker et al; U.S. Pat. No. 5,958,007 to Lee et al.; U.S. Pat. No. 5,884,270 to Walker et al.; and U.S. Pat. No. 6,012,046 to Lubien et al.

The term "meeting time" and "meeting location" or "meeting place" include specific times and places and also more generalize times (e.g., time, time range, day, week, etc.) and generalized place (e.g., specific restaurant, neighborhood, zip code, city, etc.).

The present invention relates generally to a computer-based service for enabling individuals to network with other individuals. More specifically, the invention relates to a method and system which enables a user to use a computer network, such as the Internet, to post an invitation for a meeting such as a dinner meeting and receive acceptances from prospective users interested in accepting the posted invitations.

The Internet is a vast network of computers, cellular telephones and other communication devices, network links between the devices, and protocol and other interface standards that provide a communication network for computer representatives to exchange computer data with other computer representatives. The World Wide Web ("the Web") provides an easy interface to the Internet. The Web allows a server computer to send information such as graphical Web pages to remote devices and allows the remote device to display or communicate the information. Web pages, for example, may contain control regions, such as simulated push buttons, that allow the user to acquire and display additional, related Web pages of information in a hypertext fashion.

The invention relates to systems and methods for allowing and facilitating the arrangement of a meeting between two or more parties (preferably anonymous parties). One broad aspect of the invention relates to enabling an individual to post an invitation for a meeting of any sort for others to review and, if interested, accept. One advantage of the inventive system is the ability to post an invitation for dinner, for example, at a specified time in a particular city. Since the invitation includes a specified time and place, last minute invitations and acceptances are possible. An individual may post in invite for an 8:00 pm dinner in the late afternoon (or even later) and receive an acceptance from another user thereby arranging a networking meeting.

Thus, a business traveler traveling to an unfamiliar city can, prior to or after arriving to the city, post an invitation for a meeting (e.g., dinner, golf, etc.) with another individual. If the invitation is for dinner, for example, the traveler can include in the invitation profile that the other party or parties be from the city (e.g., to tell the traveler about the city during his or her visit), be an alumnus from the traveler's school, be practicing in a particular profession, etc. For example, a business traveler having to spend two weeks in Miami, Fla. may, if desired, post in invitation for golf outings during her stay or invitations for breakfast with other individuals that may share her interests.

Thus, one aspect of the invention relates to a system and method which allows individuals to post invitations on a computer-based network for review and acceptance by other users. According to one embodiment, the invitation is posted and if another user is interested, that other user ("the accepting user") transmit (either directly or indirectly) an "acceptance" or "counterinvitation" (if the second user needs to modify the original invitation in any manner such as a different time or place) to the inviting user who accepts the invitation or a "counterinvitation". The system communicates the acceptance to or is accessible by the inviting party who can either confirm the acceptance (thus establishing the meeting) or decline the acceptance for whatever reason (e.g., accepting party doesn't fit profile, change of plans, etc.). If the second party submits a counterinvitation, the inviting party can either decline or accept. If the counterinvitation is accepted by the first party, the acceptance is then communicated to the accepting user/counterinvitor who may than confirm the counterinvitation and establish the meeting, in which case the original invitation is preferably modified into the counterinvitation (so that additional invitation seekers can review the updated invitation, which is the counterinvitation, should the invitation allow for additional guests at the meeting).

According to one preferred embodiment, the invitations are stored in an invitation database and are searchable by users. Preferably, the invitations are categorized by location of proposed meeting (e.g., city, zip code, etc.), type of proposed meeting (e.g., golf outing, dinner, etc.), any preference/criteria (e.g., attorney, Norte Dame alum, real estate agent, etc.), type of meeting place (e.g, type of restaurant, cost of meal, type of golf course (private or public), etc) or combinations thereof.

According to one preferred embodiment, the invitations may be displayed on an electronic bulletin board which lists the invitations and provides invitation information (or summaries) including date posted, location of proposed meeting, proposed meeting time, deadline for accepting, how many invited to attend (e.g., one, two, three or more), whether a minimum number for acceptances are desired (e.g., "at least two" or more), whether there are any acceptances (e.g., if one user has already accepted and there are two more "slots" remaining in the invitation), an preference/criteria (e.g., attorney, resident of city, etc.).

Preferably, only computer users who are "members" or "subscribers" of the service can post invitations and/or review, browse and/or search the invitations and/or respond to the invention with an acceptance or counterinvitation.

One advantage of limiting access to "subscribing" or "member" users is to provide "quality control". That is, subscribers or members would provide the service with personal information including email, residence and/or other identifying information. This would decrease the likelihood of pranks such as the posting of a "fake invitation" or "fake acceptance". A service which provides genuine invitations and acceptances would clearly be advantageous to the users. Alternatively, "quality control" may also be provided by charging users with a fee to post an invitation and/or review, browse, and/or search invitations and/or accept an invitation. For example, the method and system may include a transaction fee and/or a deposit which is charged to the user's credit card or the like.

An additional option for providing "quality control" may be to provide the service without charge but have the user's place a "deposit" (e.g., using a credit card) in order to post an invitation and/or transmit an acceptance. If the user fails to honor the invitation or acceptance, the user may forfeit the deposit. Alternatively, there may be a "fine" imposed on users who do not honor invitations or acceptances.

Methods of allowing individuals to post information and later receive information from other individuals in response to the posting of the information are known in the art. For example, U.S. Pat. No. 5,978,768 to McGovern et al. discloses a method of posting on-line employment advertisements where an employer posts an advertisement for a particular position (e.g., engineer, attorney, computer programmers, etc.) including a brief description of the position, location, etc. The method also allows the employer to receive resumes from individuals seeking employment, where the resumes are automatically screened and organized. See also, U.S. Pat. No. 5,960,406 to Rasansky et al.; U.S. Pat. No. 5,991,796 to Anupam et al.; U.S. Pat. No. 5,857,708 to Harvey.

Similarly (e.g., using similar technology readily available to those in the art), the system and method of the invention preferably allows the inviting user to post an invitation containing invite information including, for example, proposed time or time range of meeting, proposed place of meeting (e.g., city, neighborhood, zip code, particular restaurant, particular golf course, etc.), required or requested background, preference and/or criteria of the desired "guest(s)" (e.g., an attorney, an accountant, a civil war buff, a golfer, a sailor, a New Yorker, a Bostonian, etc.). The accepting/reviewing users interested in accepting such invitations are able to review, browse and/or search such invitations. Preferably, the accepting/reviewing users can review, browse and/or search such invitations by category such as by time and/or place.

An acceptor user (i.e., accepting/reviewing user) may then select an invitation and submit a proposed acceptance. The proposed acceptance may be accessed by or transmitted to the inviting user. Preferably, the proposed acceptance is emailed, facsimiled, or otherwise transmitted to the invitor user. U.S. Pat. No. 5,974,406 to Bisdikian, et al.; U.S. Pat. No. 6,014,090 to Rosen et al.; U.S. Pat. No. 5,889,473 to Wicks; U.S. Pat. No. 5,944,786 to Quinn; U.S. Pat. No. 6,028,933 to Heer et al.; U.S. Pat. No. 6,009,469 to Mattaway et al.; U.S. Pat. No. 6,018,657 to Kennedy, III et al.; U.S. Pat. No. 5,999,612 to Dunn et al.; U.S. Pat. No. 5,963,913 to Henneuse et al.; U.S. Pat. No. 5,959,577 to Fan et al.; U.S. Pat. No. 5,966,068 to Wicks et al.; U.S. Pat. No. 5,889,473 to Wicks. Alternatively, the acceptance may be accessible by the invitor and the invitor checks the status of his or her invitation.

Preferably, unacceptable acceptances (e.g., do not match the criteria set forth in the invitation) are screened by the system. More specifically, if the inviting user requested to meet with a resident of a town he is visiting (e.g., to learn about the town), and a user who is not a resident of the town transmits or posts a nonconforming acceptance, the system preferably either screens the improper acceptance (e.g., doesn't allow it to be posted or transmitted to the invitor) or "tags" the acceptance as nonconforming so that the invitor can readily recognize that it is improper and not review it or otherwise respond to it.

According to another embodiment multiple acceptances are categorized for the invitor user (e.g., time posted, by closest match, by any time deadlines set for responding, etc.).

According to another embodiment, the system and method of the invention allows users to post invitations and accept invitations anonymously so that the other users of the system do not know the identity of the other user. Preferably, the only information made available to the other users is that which was provided by the user in the user's public profile (discussed further below). Of course, if an invitation is posted by a first user, accepted by a second user and a meeting date confirmed by each party, the first and second user may learn the others identity at the meeting or during the arranging of the meeting. Users may also know the identity of another user because of previous meetings and/or because the user includes this information in the user's profile (e.g., name, member identification number, etc.). The ability to communicate anonymously between the other users is just one feature provided by the inventive system. This allows the users to develop the professional networking connections which further the individual's career without any personal obligations which may arise from "knowing" an individual personal or exchanging personal information.

According to another embodiment, the users are given an option to remain anonymous throughout the process. For example, a user may, for example, wish to schedule a meeting with an individual who has worked for a particular company or in a particular city for information purposes only because the user is making a job change. Such a user may desire maintaining anonymity before, during and after a meeting to avoid embarrassing situations such as word getting back to the user's present employer that the user is planning on moving or changing jobs. Preferably, the users are able to designate in the invitation the desire to remain anonymous. Preferably, the system and method provides users with a secured personal identification number. U.S. Pat. No. 5,971,272 to Hsiao.

According to one embodiment, the system also dynamically accounts for the user's interests. U.S. Pat. No. 5,999,975 to Kittaka et al.

According to another embodiment, if an invitation receives an acceptance by an accepting user, the system sends the acceptance or other notice or alert to the inviting user's mobile pager or other personal communication device or by email or the like. The message may also be forwarded to the user by the server over another network, such as the public telephone network, to a selected computer or to a selected facsimile machine at the recipient's office, home, hotel or other destination. See, for example, U.S. Pat. No. 5,978,837 to Foladare et al.

According to one embodiment, the information such as invitations and/or acceptances may be downloaded from Internet or other network to a user's hand held computer device or other mobile computer system. U.S. Pat. No. 5,978,833 to Pashley et al.

As stated above, the users may be "members" or "subscribers" to a service which provides access to the inventive system and method. Preferably, in order to access the system and use its functionality, users are asked to store information in the database. Individuals who use the system are preferably then allocated their "personal webpage". According to one preferred embodiment, the individual initially answers a number of questions about himself or herself to construct the individuals profile for their personal webpage. The personal profile may include a public profile containing public information which may be disclosed to other users on the system and a private personal profile which is not made available to the other users.

Public information may include the following: profession; city of residence and/or place of employment; place of birth; country of origin; education; employer; college/graduate school; hobbies (golf, tennis, running, etc.); age; favorite foods and/or cuisines; any allergies (e.g., to any foods); personal contact (e.g., phone number of closest relative or friend in the event of any emergency during meeting). The public profile may also include the personality traits of the user to increase the likelihood of a good match between users (e.g., brief description of self, favorite book/movie, latest book read, astrological sign, famous personality most alike or compared to, pet peeves, political beliefs, religion, etc.).

The personal profile also preferably includes a private profile containing private information which is preferably not shared with other users. Private information may include the following: the sex of the individual; home and/or business address and telephone number; home and/or business email address; credit card and/or debit card number and information; name of employer; etc.

The purpose of a private profile would be to maintain user information for administration purposes (e.g., charging fees, etc.) and/or "quality control" (described above). An additional advantage would enable users to avoid meetings which may make the user uncomfortable. For example, although the intent of the system and method of the invention is not to provide a "dating service" and thus the gender of the users should be irrelevant, there may be legitimate reasons why a user wishes to meet only with individuals of a certain gender. For example, if the inviting user is a female and wishes to have a networking dinner with one or more individuals, the user may wish to meet with only females for safety or other reasons (e.g., is traveling in a foreign city). Preferably, the system allows the female user to post an invitation that includes "females only" in the criteria. Alternatively, the system may provide that such an invitation may be review and/or accepted only by members who are females. At the same time, the system would preferably not allow a male to post a "females only" invitation disguised as a female because of his private profile would indicate his gender.

Preferably, a user registers and constructs the personal profile by supplying information in various fields on a form (e.g., a Web page) supplied by the server to the user. After filling such fields, the user is prompted with an option to post an invitation or review posted invitations (discussed below).

In one embodiment, the individuals can register only once to prevent the creation of multiple profiles for a single individual. Preferably, it is possible to change existing information in the personal profile. Preferably, the information cannot be changed very often, because this would unnecessarily complicate operation of the system. In one embodiment, the number of times information may be changed by residents is limited to once a month, for example.

According to one embodiment, posting an invite on the invitation board is only possible if the "invitor" is registered and therefore has his or her own personal web page and/or personal profile. In order to post an invite, the user first provides an invite profile which includes information regarding the invitation such as (a) location (e.g., city or area within a city or specific restaurant) (b) time (day and range of time) (c) event (e.g., breakfast, lunch, dinner, drinks, tennis, golf, etc.), (d) price ranges (e.g., moderately priced restaurant, expensive restaurant, etc.). Once the invite profile is completed, it is preferably posted on an invitation bulletin board so that it may be reviewed by other users.

The system keeps a record of the total number of visitors, total number of users registered, the total number of invitations posted, the total number of invitations reviewed, the total number of invitations accepted, the total number of invitations confirmed and the total number of meetings completed.

The system may also keep a record of statistics relating to an individual user such as total number of invitations posted, accepted or confirmed by the individual user, total number of meetings individual user participated in and/or list of any such meeting (including when and where such meetings occurred) and total number and/or list of other users the individual user has communicated with, whether at a meeting or via intrasystem mail.

According to one embodiment, an automatic maintenance procedure is provided (e.g., "stale" invitations are deleted). U.S. Pat. No. 5,963,913 to Henneuse et al. Preferably, in order to free up unused space on the system, inactive personal pages may be cancelled. For example, if a user has not logged into the system for three months, he or she may be sent an email message asking him or her whether he or she still wants to be registered in the system. An automatic procedure then asks the user if the user want to remain registered or wants to be removed from the database. If no reply is received with two weeks, for example, the users personal profile will be removed automatically.

According to another embodiment, if the user posts an invitation, receives acceptances, and then fails to confirm the acceptances, the system may send an email or other communication to the invitor requesting confirmation so that the accepting users may plan accordingly. If the invitor fails to respond, the user may be asked whether he or she still wants to participate. Alternatively, the invitors personal page may be cancelled and/or fined an certain dollar amount to discourage the posting of "false" invitations or the like.

Similarly, users who accept an invitation but fail to confirm the confirmation or participate in the scheduled meeting may be asked if they want to remain register or cancel their registration, automatically cancel their personal Web page or profile, and/or fine their personal web page.

According to a preferred embodiment of the invention, the system and method are accessible via a computer network such as the Internet. The explosive growth of the Internet, and specifically, the growth of the World Wide Web ("the Web"), has allowed a number of new services and products to be provided in an efficient and cost effective manner. The Web is built around a network of "server" computers which exchange requests and data from each other using hypertext transfer protocol ("http"). A designer designs the layout of a Web page, for example, using Hypertext Markup Language ("HTML"). Several versions of HTML are currently in existence. Examples include HTML versions 2.0 and 3.0, as specified by the WWW Consortium of MIT.

A user views a Web page using one of a number of commercially available "browser" programs. The browser submits an appropriate http request to establish a communications link with a Web server of the network. A typical http request references a Web page by its unique Uniform Resource Locator ("URL"). A URL identifies the Web server hosting that Web page, so that an http request for access to the Web page can be routed to the appropriate Web server for handling. Web pages can also be linked graphically to each other.

Information presentations on Web pages are often abbreviated or shortened in order to save space and to produce better layouts. Typical examples of abbreviated or shortened information includes the use of icons. A user may merely click the icon, for example, to retrieve additional information and/or web pages.

FIG. 1 illustrates a system 100 according to one embodiment of the invention. System 100 includes user terminals 101A, 101B, 101C in which the networking methods according to the invention may be executed. A user receives and inputs information provided on user terminal 101A which is connected to server 103 via network 102 through two-way communication links. Network 102 may be any suitable network, preferably a public switched phone network, such as the Internet, an Intranet, LAN or the like. Network 102 may include a standard frame-relay network such as is operated by AT&T or MCI. At various locations, preferably geographically remote from that of server 103, a number of intermediate local servers may connect server 103 via network 102 to user terminals 101A, 101B and 101C. A user preferably accesses server 103 via network 102 using user terminal 101A. System 100 may further comprise nonnetworking user terminal 104 which is also connected to server 103 via network 102. Nonnetworking user terminal 104 may be a commercial user which provides information to the users (e.g., advertisements for products and services) and/or tracks the activity or is provided with tracking information to develop targeted advertising and marketing to the users. See, U.S. Pat. No. 6,026,370 to Jermyn; U.S. Pat. No. 5,937,037 to Kamel et al The formats and contents of the information communicated by the systems of the present invention can include ads similar to the types of advertising typically displayed on Web pages via the Internet (U.S. Pat. No. 6,009,410 to LeMole et al.; U.S. Pat. No. 6,009,409 to Adler et al.; U.S. Pat. No. 5,937,392 to Alberts; U.S. Pat. No. 5,959,623 to van Hoff et al.; U.S. Pat. No. 5,913,040 to Rakavy et al.; U.S. Pat. No. 5,933,811 to Angles, et al.; U.S. Pat. No. 5,948,061 to Merriman et al.

For example, a nonnetworking user may be provided with the iternary of a traveling user so that the nonnetworking user can provide the user with useful information such as hotel rates, entertainment, etc. Preferably, users are able to "block" such advertising and tracking if desired.

According to another embodiment, the method or system is connected to a network such as the Internet. Company subscribers pay to have their ads downloaded and/or delivered by the system and/or pay an additional premium when a target ad is delivered to a targeted consumer or group of consumers. See, U.S. Pat. No. 5,946,646. According to another preferred embodiment, the number of advertisements displayed are recorded for billing purposes. Preferably, the device also includes a "filter" which may filter out targeted ads which may be objectionable to the targeted consumer. The system also preferably comprises a central storage system for storing a plurality of advertisements and/or comprises a means for certifying and/or recording that an advertisement has been displayed. See, U.S. Pat. No. 5,774,170 to Hite et al.; U.S. Pat. No. 6,002,393 to Hite et al.

According to another embodiment, the "ads" displayed to a user is recorded. Then, when the user undertakes post-impression transactional activity such as ordering products and/or services related to the displayed ad or makes further inquiries regarding the same, the transactional activity along with the user's identification is recorded. Based on these records, the effectiveness of the ads can be measured. See, U.S. Pat. No. 6,006,197 to d'Eon, et al. Preferably, additional fees are charged to the ad source based on the effectiveness of the ads.

Server 103 preferably controls the flow of data to and from networking user terminals 101A, 101B and 101C and nonnetworking user terminal 104. There are no special requirements for networking user computer 101A or nonnetworking user terminal 104, other than that each have some means of assessing the information from server 103, preferably some means of assessing the information via network 102. Terminals 101A, 101B and 101C and nonnetworking user terminal 104 may be structurally the same or different, except networking user terminals 101A, 101B and 101C are used by networking users, whereas nonnetworking user terminal 104 is used by nonnetworking users such as advertising agents, direct markets, product/service providers, etc. System 100 may include any number of networking user or nonnetworking user computers. System 100 may include server 103 or means for conveying information to and from server 103 when server 103 is external to system 100.

Thus, the server's network interface is preferably able to support multiple simultaneous data connections with multiple users. In a preferred embodiment, a server or central computer is accessible over the Internet or commercial on-line service such as America Online, CompuServe, or Prodigy, allowing multiple test-takers to access the central computer via simultaneous on-line connections. In another embodiment of the invention, the test questions can be downloaded directly from the central computer to the external terminals.

Figure 2:
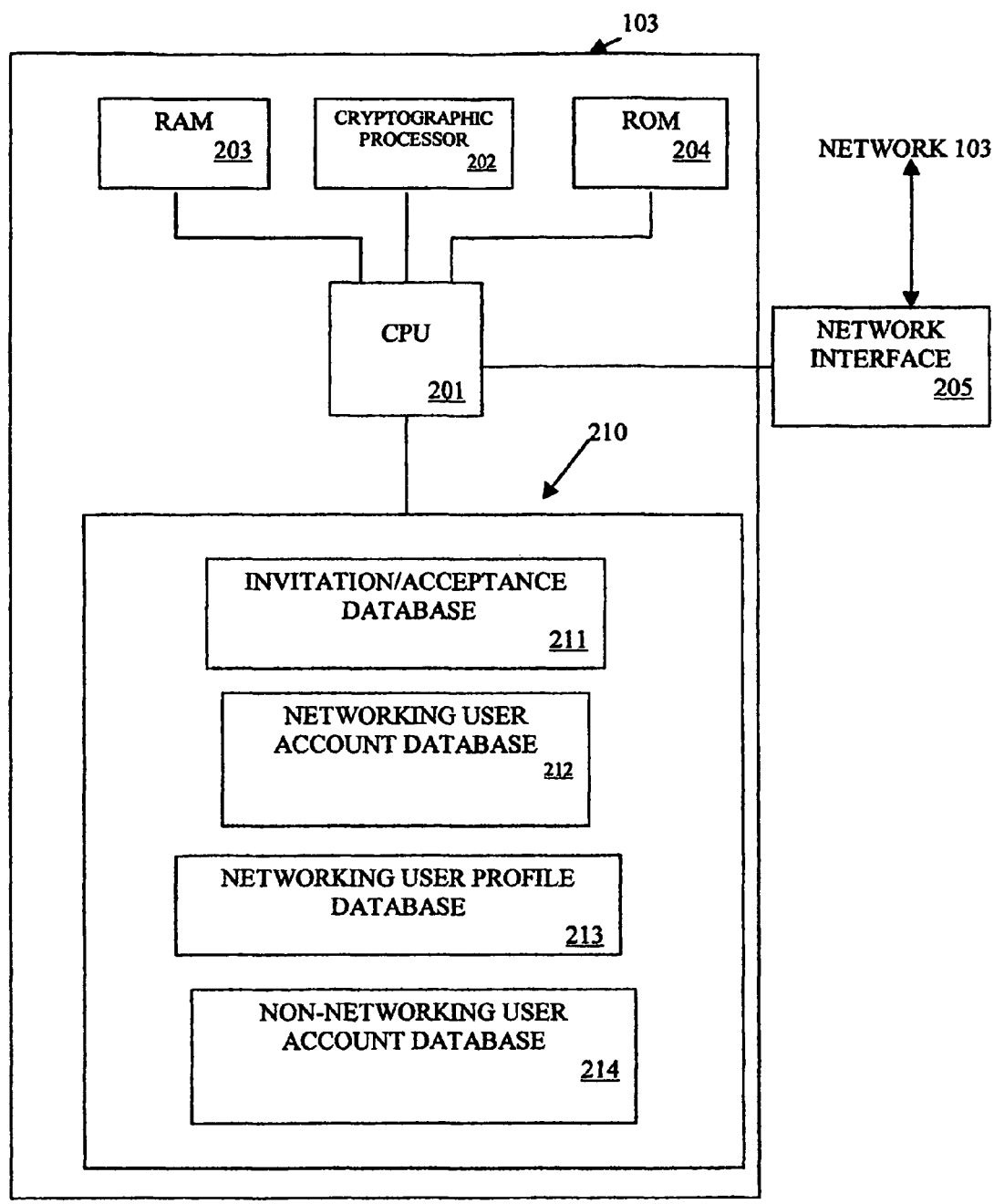
FIG. 2 illustrates a block diagram of the server of FIG. 1.

FIG. 2 illustrates a block diagram of server 103 of FIG. 1 according to one embodiment of the invention. Server 103 includes CPU 201, cryptographic processor 202, RAM 203, ROM 204, network interface 205 and data storage device 210. Network interface 205 links server 103 to network 102. CPU 201 is preferably connected to each of the elements of server 103. Server 103 may comprise one or more servers (not shown). CPU 201 executes program instructions stored in RAM 203, ROM 204 and data storage device 210 to perform various functions of the present invention.

Data storage device 210 preferably includes a combination of a plurality of databases such as an invitation/acceptance database 211, networking user account database 212, networking profile (public and private) database 213 and nonnetworking user account database 214, as well as program instructions (not shown) for CPU 201. Invitation/acceptance database 211 may contain current invitations, acceptance, counterinvitations, historical information relating to the same, etc. Networking user account 212 may include networking user information such as account status, personal profile, activity (e.g., current and past invitations and/or acceptance, meetings, etc.), etc. Networking profile database 213 may include networking user profiles, statistics, etc.

The databases in data storage device 210, such as databases 211, 212, 213 and 214, are preferably implemented as standard relational databases capable of supporting searching and storing multimedia information such as text, audio, graphic, photographs, video, QuickTime movies, etc. Data storage device 210 preferably comprises static memory capable of storing large volumes of data, such as one or more floppy disks, hard disks, CDS, or magnetic tapes.

CPU 201 is also preferably programmed to search databases including databases 211, 212, 213 and 214 and transmit information in response to a networking user or nonnetworking user search request. CPU 201 receives a search request containing certain criteria (e.g., a search for invitations for dinner for next Tuesday in Chicago) and searches the databases to find one or more matches. Based upon the search, CPU 201 releases certain information to the networking user or nonnetworking user requestor. Preferably, CPU 201 may assign pseudonyms to each networking user, if requested, to maintain anonymity. There are a number of search techniques that can be used including keyword, fuzzy logic and natural language search tools. According to one embodiment, CPU 201 compares the criteria against each networking user profile stored in system 100 using one or more search algorithms and transmits to the requestor the networking user profiles or group or subgroup of networking user profiles identified.

CPU 201 is preferably also programmed to provide communications, preferably anonymous communications, between one or more networking users and one or more nonnetworking users. In one embodiment, CPU 201 can receive and store electronic mail messages in electronic mailboxes assigned to each networking user and/or nonnetworking user, thereby establishing a non-real-time communications channel between networking users and education researchers, for example.

CPU 201 preferably comprises a conventional high-speed processor capable of executing program instructions to perform the functions described herein. Although server 103 is described as being implemented with a single CPU 201, in alternative embodiments, server 103 could be implemented with a plurality of processors operating in parallel or in series.

Network interface 205 connects CPU 201 to network 103. Network interface 205 receives data streams from CPU 201 and network 103 formatted according to respective communication protocols. Network interface 205 reformats the data streams appropriately and relays the data streams to network 103 and CPU 201, respectively. Network interface 205 preferably accommodates several different communication protocols.

Cryptographic processor 202 is programmed to encrypt, decrypt and authenticate the stored data in one or more of the databases described above. The networking user's name, for example, may be encrypted in the networking profile database 213 so that nonnetworking users can review the information in the database without learning the networking user's identification.

RAM 203 and ROM 204 preferably comprise standard commercially-available integrated circuit chips.

Figure 3:
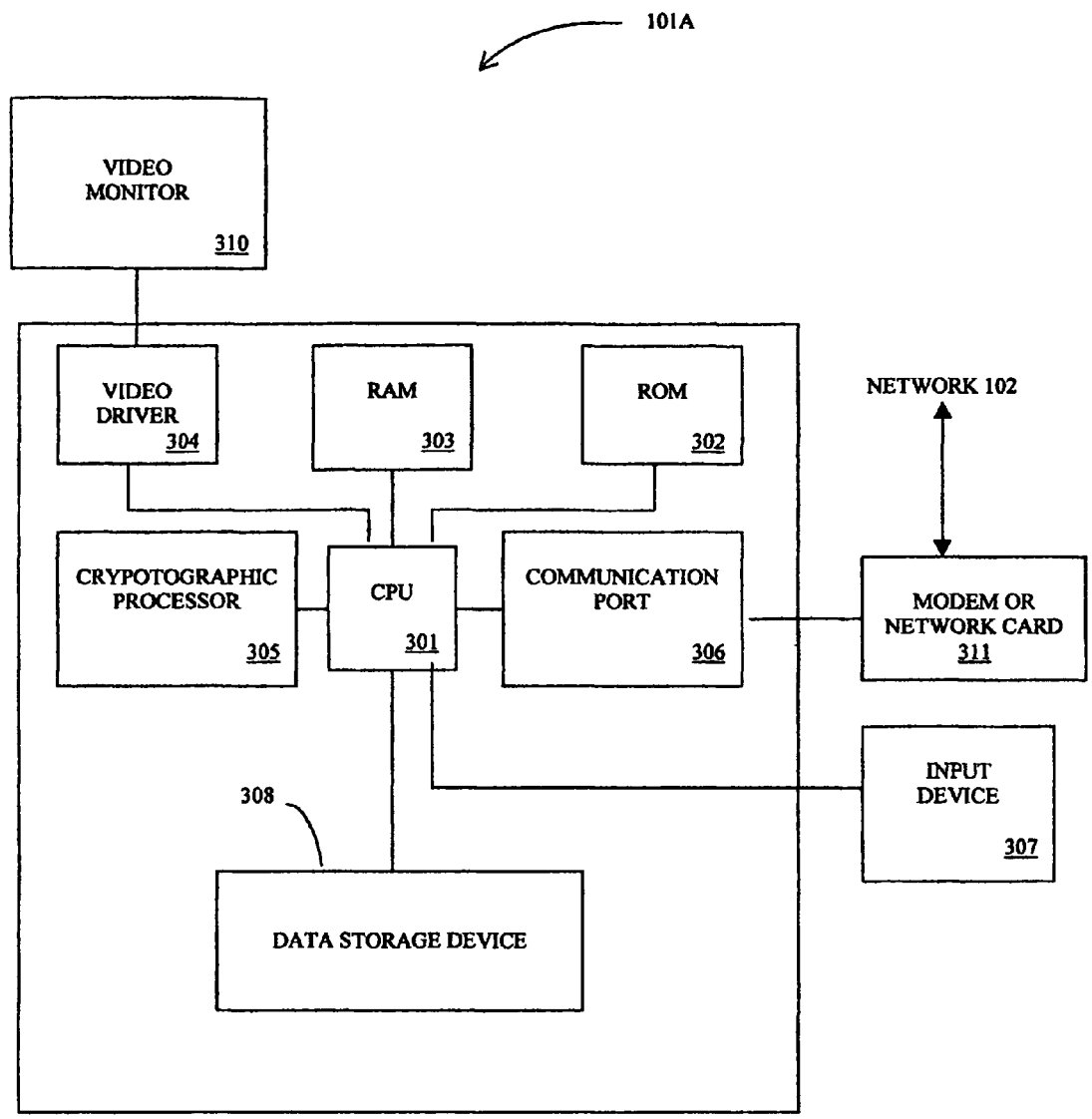
FIG. 3 illustrates a block diagram of the networking user terminal of FIG. 1.
Figure 4:
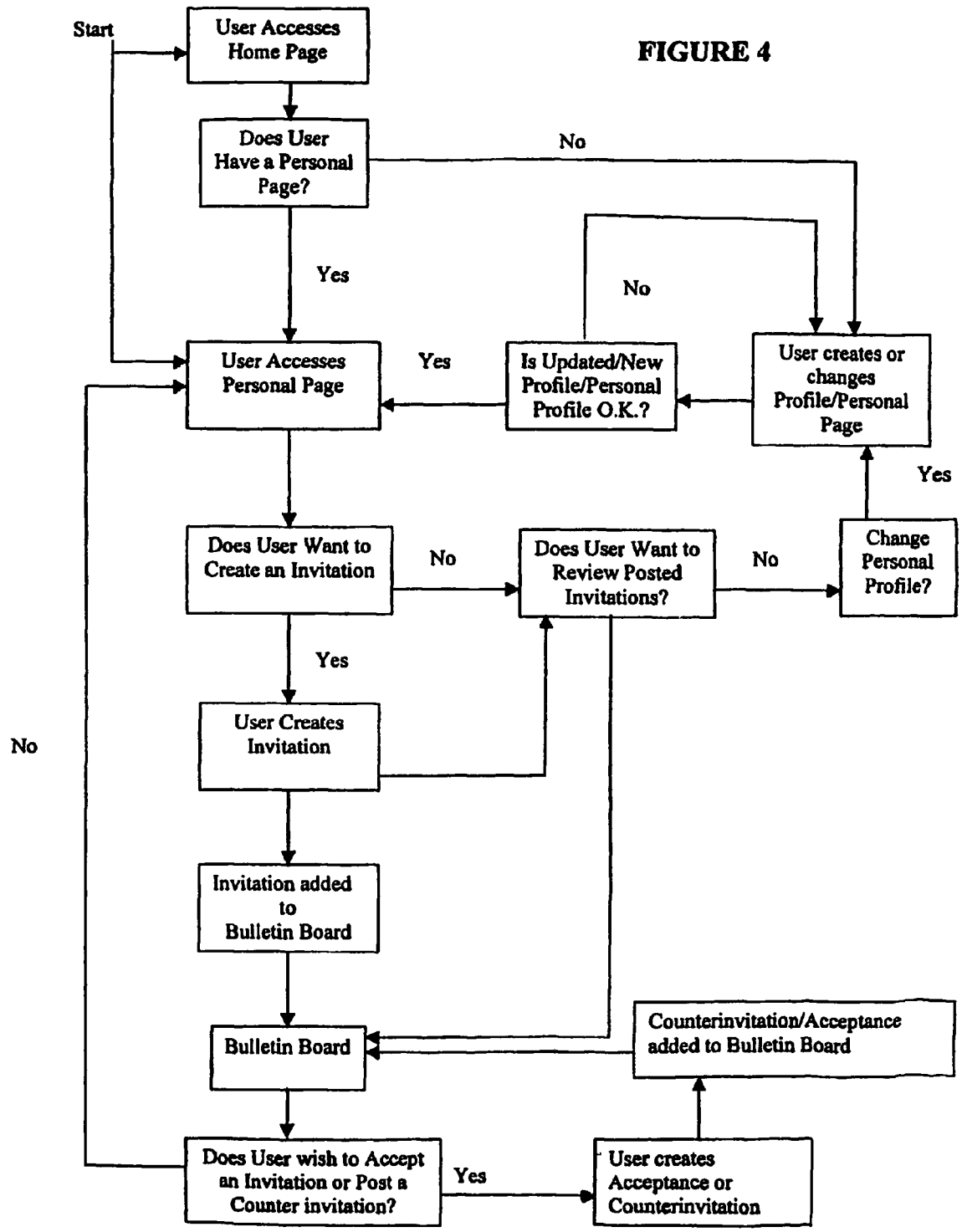
FIG. 4 shows a flow diagram according to one embodiment of the invention.
Figure 5:
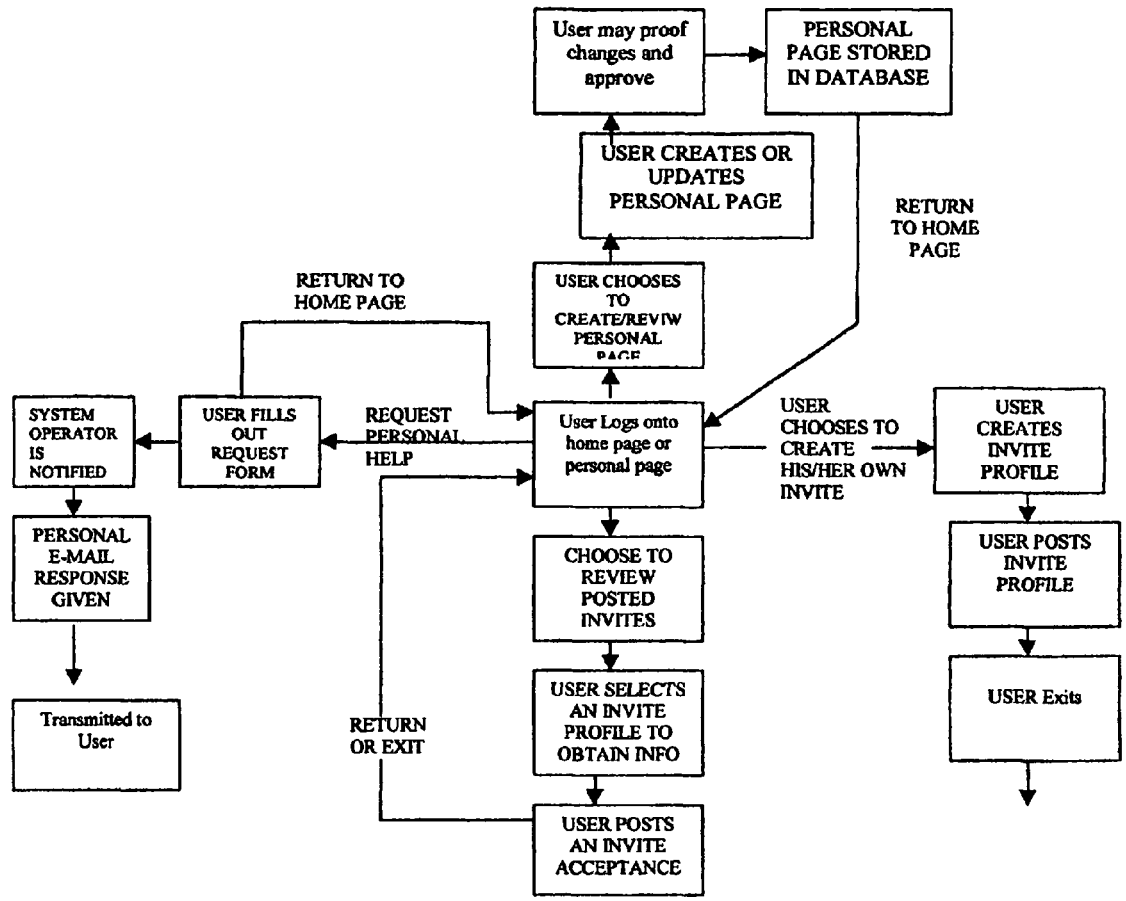
FIG. 5 shows a flow diagram according to another embodiment of the invention.

FIG. 3 depicts a block diagram of networking user terminal 101A of FIG. 1. Networking user terminal 101A provides the networking user with an interface to system 100. Preferably, networking user terminal 101A allows a networking user to enter data and transmit the data to server 103 via network 102 and also receive data from server 103. Networking user terminal 101A preferably includes CPU 301, which is connected to ROM 302, RAM 303, video driver 304, cryptographic processor 305, communication port 306, input device 307, and data storage device 308. Input device 307 may include a keyboard, touchpad, mouse, any other known input device or combinations thereof. Video monitor 310 is connected to video driver 304 and modem 311 is connected to communication port 306 and network 102.

CPU 301 executes program instructions stored in RAM 303, ROM 301, and data storage device 308 to carry out various functions associated with networking user terminal 101A. In a preferred embodiment, CPU 301 is programmed to receive data from input device 307, receive data from communication port 306, output queries and received data to video driver 304 for display on video monitor 310, and output data to communication port 306 for transmission by modem 311 to network 102. CPU 301 preferably transmits the data to cryptographic processor 305 for encryption before outputting data to communication port 306 for transmission to network 102. When CPU 301 receives encrypted data, CPU 301 transmits the encrypted data to cryptographic processor 305 for decryption.

CPU 301 preferably comprises a high-speed processor capable of performing the functions described herein. Although networking user terminal 101A is described as being implemented with a single CPU 301, in alternative embodiments, networking user server 101A could be implemented with a plurality of processors operating in parallel or in series.

Video driver 304 relays received video and text data from CPU 301 to video monitor 310 for display.

Data storage device 308 preferably comprises static memory capable of storing large volumes of data, such as one or more floppy disks, hard disks, CDS, or magnetic tapes.

Communication port 306 relays data between CPU 301 and modem 311 in accordance with conventional techniques. Network interface 205 receives data streams from CPU 201 and network 103 formatted according to respective communication protocols. Network interface 205 reformats the data streams appropriately and relays the data streams to network 103 and CPU 201, respectively. Network interface 205 preferably accommodates several different communication protocols.

Cryptographic processor 305 is programmed to encrypt and decrypt data in accordance with conventional encryption/decryption techniques and is preferably capable of decrypting code encrypted by cryptographic processor 202. The networking user's name, for example, may be encrypted in the networking profile database 213 so that nonnetworking users can review the information in the database without learning the networking user's identification.

Modem 311 preferably comprises a high-speed data transmitter and receiver. Input device 307 preferably comprises any data entry device for allowing a user to enter data, such as a keyboard, a mouse, a video camera, a touch or writing pad, key pad or microphone.

RAM 203 and ROM 204 preferably comprise standard commercially-available integrated circuit chips.

There are a number of ways a networking user or nonnetworking user may input information into the system and/or make a selection using the networking user terminal 101A including the use of selected strokes on a keyboard, the clicking of a mouse after moving the pointer to a particular icon or graphic or the like on the video screen, and/or by touching the video screen, touch pad or the like. Such methods and devices for allowing a user to input information or make selections into a computer-based system are well known in the art.

Using this invention, remotely-located networking users at a number of networking user terminals 101A, 101B and 101C can simultaneously use the invention and compare their results with other remotely located networking users. The test preparation can be done on an ongoing basis with no need for an on-line connection where the networking user downloads the information. Alternatively, an on-line connection (e.g., Internet, World Wide Web, American Online, CompuServe, Prodigy, etc.) can be used for even greater flexibility in test question distribution and control.

Whether on-line or off-line, the networking user's scores are securely associated with the networking user's identity (such as by using a secured personal identification number, See U.S. Pat. No. 5,971,272), which in turn is associated with the networking user's profile.

Thus, the networking user's identity is preferably confidential. One form of advantageous anonymity useful in the invention involves "shielded identity", where a trusted agent (e.g., the operator of the server 103) knows the identity of the masked party (e.g., networking user), but does not reveal that identity to others except under certain circumstances. U.S. Pat. No. 5,884,272.

Moreover, the information transmitted to and from users to the system is preferably secured using encryption or other security measures. See for example, U.S. Pat. No. 5,978,373 to Lubien et al.; U.S. Pat. No. 5,917,912 to Ginter et al.

One broad aspect of the invention is the ability of users to review posted invitations and, if desired, accept any such invitation to schedule a meeting with other user(s). According to one embodiment, the user can query the database to search for invitations for meetings at a particular time or place and/or invitor profile.

Selections may be made for querying the database using radio buttons (e.g., by click or tabbing). In alternative embodiments, selections can be made by checking boxes, by using pull-down menus, by entering text, or by any other appropriate method.

In many database environments, information stored within the database is retrievable using a query language. However, preferably users of the system can retrieve information stored by other users without having to know complex query statements, and the result of such a query will be a representation of graphical elements.

The system may be funded by user membership fees (e.g., daily, weekly, monthly or yearly) or a fee may be charged for each invitation posted and/or each invitation accepted. Preferably, the primary purpose of such fees in not only to support the system but also to provide an element of quality control for the invitations posted and accepted. For example, user may be discouraged from using the service if "false" invitations and/or "false" acceptances are posted on the system. A user may believe such an invitation or acceptance is real and show up to the scheduled meeting place only to find that the invitation or acceptance was fraudulent. This would obviously frustrate a user who otherwise may have made other plans or selected a different invitation or acceptance. Such fraudulent activity could decrease the benefits of the inventive system. Thus, the requirement that fees be paid for use of the system or fines charges to those who post fake invitations or acceptance should improve the quality of the service.

In one embodiment, the database homepage, personal WebPages and/or invitation bulletin board includes advertising graphics. The advertising graphics can be in the form of billboards, links, banners or the like. In one embodiment, the advertiser can design the advertisement and provides the designed advertisement to the system. For example, the advertiser can indicate to the system the location of a graphics file. This may include a URL if the network employed is the Internet, may include a drive and file name if the network employed is an Intranet network, a local area network, or a wide area network, or a graphics file may be transferred if a dial up connection is employed. In one preferred embodiment, the advertiser can decide to have its advertisement displayed only when the user performing a search meets the advertisers pre-defined profile. For example, if the users has indicated in his profile that he is a golfer, an advertiser of golf products or services may display an advertisement when the user is logged on. Alternatively, the profile of an invitation may also prompt certain advertisements. For example, a restaurant or hotel or a limousine service in New York City may display advertisements to users who post in invitation for or users who are reviewing invitations for New York City. In one embodiment, the advertiser may target certain users by e-mail to their personal webpage.

According to one preferred embodiment of the invention, individuals are provided with personal private WebPages. When the member logs into the system, the member's personal pages in display providing the member with information including scheduled meetings, invitations posted by the member, any invitations accepted by the member, etc.

Preferably, the webpage includes icons associated with particular functions of the system including an icon associated with posting an invitation, an icon associated with reviewing the invitations bulletin, etc.

According to one embodiment, each set of users who confirm a meeting are provided with a temporary "guest identification". The guest identification can be used to connect with the other individual without exchanging full names. Moreover, users can be instructed to exchange codes when they meet. Then if one doesn't show, this can be verified by asking for code. If he has it, he must have attended the meeting.

According to another embodiment, users are also provided with personalized information based on their user profile, travel iternary, invitations or acceptances and the like. For example, if a user based in New York City posts an invitation for dinner in Chicago for the following evening, the system may provide the user with weather information at the travel destination (e.g., Chicago) and/or along a travel route. See, U.S. Pat. No. 5,999,882 to Simpson et al. which relates to a method and system for providing weather information along a travel route. See also U.S. Pat. No. 5,999,975 to Kittaka et al which relates to a method for providing information on-line to a user based on the user's interest. See, U.S. Pat. No. 6,014,090 to Rosen et al.

As stated above, the Internet comprises a vast number of computers, computer networks, cellular phones, Palm pilots and the like that are interconnected through communication links. The interconnected computers exchange information using various services, such as electronic mail, Gopher, and the World Wide Web ("Web"). The Web allows a server computer system (e.g., Web server or Web site) to send graphical Web pages of information to a remote user computer system. The remote user computer system can then display the Web pages. U.S. Pat. No. 5,960,411. One broad aspect of the invention relates to a method and system for placing an "invite" via the Internet. According to one embodiment, the invite is placed by an inviting user at the inviting user system and received by a server system. The server system receives inviter information including identification of the invitor, profile information and invite information such as time and place of proposed meeting. The server system then assigns a client identifier to the inviting user system and associates the assigned client identifier with the received invite information. The server system sends to the client system the assigned client identifier and an HTML document identifying the invite and including an order or authorize button. The client system receives and stores the assigned client identifier and receives and displays the HTML documents including the invite information. In response to the selection of the authorize button, the client system sends to the server system a request to post the invite for other users to review. The server system receives the request and posts the invite information for other users to review and accept. Preferably, the invite information posted does not include the client identifier to maintain the anonymity of the invitor.

According to one embodiment, the method and system provides the invitor and/or accepting user to pay for the expenses associated with the meeting. For example, an invitor may post an invite to met with one or more individuals from a specified group (e.g., lawyers, accountants, consultants, computer scientists) and offer to pay for the expenses associated with the meeting (e.g., pay for the dinner).

Preferably, the invention also allows users to establish and maintain user-controlled anonymous communications. See, for example, PCT Patent Publication WO 98/10558 by Walker et al. and PCT Patent Publication WO 98/04061 by Walker et al.

According to another preferred embodiment, the system and method employs an advanced positioning system in combination with a cellular communication network to determine the location of a user accessing the services via cellular telephone. For example, the system may determine the service area the user is located using information from the closest mobile switching center (MSC) or cell site being used by the user or from a global positioning satellite or by other means. See, for example, U.S. Pat. No. 5,983,109 to Monty. The system can thereby provide the user with updated information relating to that region such as weather reports, traffic and travel reports, newly posted invites in the region that might interest that user, special events.

Another embodiment of the invention provides a directory of users. Preferably, the users authorize the posting of personal information in such a directory. The directory may include information such as the user's residence, profession, hobbies, etc. This would enable users to readily contact other users for meetings and/or exchanging information and the like and further enhance the networking capabilities of the invention. Preferably, the invention provides an on-line directory such as a web page which enables individual users to revise and update their personal information. Methods of creating directories are known in the art. See, for example, U.S. Pat. No. 5,940,834 to Pinard et al. Preferably, the directory is made accessible to a user at the discretion of the administrator of the web server. The information is then accessible via website, browser, fax, e-mail, voicemail, mail, software and other communication means.

One advantage of the Web is that it allows for the definition of device-, system- and application-independent electronic content. The details of how to display or play back that content on a particular machine within a particular software environment are left to the individual web browsers. The content itself, however, need only be separated once. Thus, the Web offers the ultimate in cross-platform capability. However, pre-existing collections of information, such as pre-existing databases, can rarely be directly placed on the Web. Placing such databases on the Web typically requires the use of a gateway programs. Preferably, the system of the invention employs a computer network and database to provide a hardware-independent, dynamic information system in which the information content is entirely user-controlled. U.S. Pat. No. 5,778,367 to Wesinger, Jr. et al.

Preferably, the users are provided with information while they are logged into the inventive system. Suitable methods and systems for dynamically displaying data items on a user's computer is set forth in U.S. Pat. No. 5,959,621 to Nawaz, et al. (discloses a ticker display pane for dynamically displaying the date items).

Another aspect of the invention includes information to the individual user's based on a user's travel profile (e.g., a personalized newspaper or personalized weather report). For example, a particular user may be traveling from Chicago to Miami for a personal trip. According to this aspect of the invention, the user will be provided with relevant, targeted information relating to Chicago and Miami based on that user's profile. Such information may include weather or traffic reports for the Miami, but include sports news or other local news from Chicago. The content of the information may also be tailored to the user's personal profile. For example, the user may live in Los Angeles, be traveling to Denver and be a Boston Red Sox's fan. Thus, the information provided to such a user may include local LA news, Denver travel information and Boston Red Sox's scores. Suitable methods for providing an automatic method and system for retrieving information based on a user-defined profile is set forth in U.S. Pat. No. 5,761,662 to Dasan. Preferably, the inventive methods and system provides information to the user adapted to the language or dialect of the user or that which is most likely to match the native language or dialect of the user. See, U.S. Pat. No. 5,944,790 to Levy. For example, the system may request the country code, numerical node address or dialect of the user and subsequently provide all information in that dialect or language.

According to another aspect of the invention, commercial users (e.g., not individual users) are provided information relating to the individual users. Preferably, this information is only provided to commercial users with the permission of the individual users. For example, hotel chains may be provided with information regarding an individuals travel plans so that any special rates or the like can be provided to the user. According to another embodiment, the system and methods also employ a tracking means to track a user on the Internet to determine additional information for the user profile. For example, if the user visits a Web site relating to golfing, the system will track this and provide related information to the user. Suitable tracking mechanisms include those set forth in U.S. Pat. No. 5,966,705 to Koneru, et al.

Methods and devices for securing transactions on the Internet are known in the art. The "personal" account has become an important feature in many commercial and non-commercial transactions. Personal accounts are used, for example, with telephone calling cards, checking and savings accounts in banks, computer networks, and credit cards. According to one preferred, the users of personal accounts which are accessed using personal account numbers with personal passwords or the like. Suitable techniques for secured personal identification numbers are set forth in U.S. Pat. No. 5,971,272 to Hsaio, Preferably, the system employs the state of the art security measures to maintain the confidentiality of personal accounts, etc. See also, U.S. Pat. No. 6,014,444 to Nakamura et al.; U.S. Pat. No. 6,016,491 to Kou; U.S. Pat. No. 6,016,350 to Funabe, et al.

Another embodiment of the invention allows users to access their personal accounts via telephone. For example, users may access their personal accounts using cellular telephones. Normally, each cellular telephone has a unique identifier which is transmitted along with the telephone call to identify the cellular telephone for billing purposes. According to one preferred embodiments, users may access their personal accounts by calling a designated number and the system recognizes the user by the unique identifier, allowing the user to access the personal account without entering their account number. Preferably, the cellular telephone user must still input a password or other security measure to gain full access.

Preferably, the method or system includes a service home web page which prompts with user options such as creating personal profile (for new users), changing personal profiles (for existing user members), review posted invitations or post a new invitation. If a new profile is needed, the system prompts the networking user to input personal information. The personal information such as name, address, E-mail address and phone number which is input on this page is preferably kept confidential.

According to one preferred embodiment of the invention, each individual networking user has a personal web page which is accessible by said individual and secure against access by other users. Preferably, personal web or personal home age includes invitation/acceptance information, travel information, prior meetings history, etc. Preferably, the different types of information are displayed in the form of text, icons and/or other suitable graphics. Graphics user interface operating systems, such as Microsoft Corporations Windows™ and any related products, have greatly improved the ease with which tasks can be accomplished on a computer. Instead of requiring the user to remember the file name and path of an application program in order to execute it, as conventionally is the case in text-based operating systems, in a graphic operating system, the user need only activate an icon that represents the application. The graphic icon is preferably activated by positioning a cursor over it and then "double clicking" on the icon with a pointing device that is used to control the cursor. Since the properties assigned to the graphic icon are linked to the executable file and specify its complete directory path, there is no need for the user to recall that information after the icon properties are initially set up to run the program. See, PCT patent publication No. WO 96/39654. Pull-down menus or keystroke-mouse combinations may also be provided to allow the networking user to view additional options. Additionally, interface objects are preferably grouped according to functionality. Preferably, the web pages automatically adapts to the user's language and customs. See, U.S. Pat. No. 5,944,790 to Levy.

While the particular methods, devices and systems described herein and described in detail are fully capable of attaining the above-described objects and advantages of the invention, it is to be understood that these are the presently preferred embodiments of the invention and are thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "one or more" and not "one and only one", unless otherwise so recited in the claim.

The invention claimed is:

1. A computer based method for facilitating an arrangement for a meeting including a first user and a second user comprising:
   (a) allowing said first user to register by providing an email address and creating a first user profile including public information and private information;
   (b) determining the location of said second user; and
   (c) providing a notification to, at an online location accessible by, said second user including updated information including meeting invitations;
   wherein said steps (a), (b) and (c) are performed using one or more computer devices and said method results in said meeting including said first user and said second user.

2. The method of claim 1, wherein said location of said second user is determined using an advanced positioning system in combination with a cellular communication network.

3. The method of claim 1, further receiving a travel itinerary from a third user and allowing another user to provide said third user with information based on said travel itinerary.

4. The method of claim 1, further comprising providing a directory of users that includes user information and allowing users to contact other users for meetings using said directory.

5. A system for performing the method of claim 1, comprising one or more computer devices for: (a) allowing said first user to register; (b) determining the location of said second user; and (c) providing said notification to, or at an online location accessible by, said second user including said updated information including said meeting invitations.

6. A computer based method for facilitating an arrangement for a meeting including a first user and a second user comprising:
   (a) receiving invitation information from said first user;
   (b) determining the location of said second user; and
   (c) providing said invitation information to, at an online location accessible by, said second user based on said location;
   wherein said steps (a), (b), and (c) are performed using one or more computer devices and said method results in said meeting including said first user and said second user.

7. The method of claim 6, wherein said location of said second user is determined using an advanced positioning system in combination with a cellular communication network.

8. The method of claim 6, further comprising providing said invitation information to, or at a location accessible by, other users.

9. The method of claim 6, wherein said first user and said second user do not know each other prior to said first user providing said invitation information in step (a).

10. The method of claim 6, further comprising communicating to said first user a communication from said second user regarding said invitation information.

11. The method of claim 6, wherein said invitation information does not include a specified invited individual.

12. The method of claim 6, wherein said invitation information includes a time or time range and a location for said meeting.

13. The method of claim 6, wherein said invitation information includes a description of who said first user would like to meet.

14. A system for performing the method of claim 6, comprising one or more computer devices for: (a) receiving said invitation information from said first user; (b) determining the location of said second user; and (c) providing said invitation information to, or at an online location accessible by, said second user based on said location.

15. The computer based method of claim 6, wherein said online location is accessible via a computer network.

16. The computer based method of claim 6, wherein said online location accessible via the Internet.

17. The computer based method of claim 6, wherein said steps (a), (b) and (c) are performed using one or more wireless computer devices.

18. The computer based method of claim 6, wherein said first user and/or said second user are anonymous users.

19. The computer based method of claim 6, wherein step (a) is performed using a computer device including a software program, recorded on computer readable medium, for controlling said computer device.

20. A computer based method for facilitating an arrangement for a meeting including a first user and a second user comprising:
   (a) receiving an invitation for said meeting from said first user; and
   (b) providing said invitation to, at an online location accessible by, other users including said second user;
   further comprising determining the location of said second user, wherein said steps (a) and (b) are performed using one or more computer devices and said method results in said meeting including said first user and said second user.

21. The method of claim 20, wherein said location of said second user is determined using an advanced positioning system in combination with a cellular communication network.

22. The method of claim 20, further comprising providing said second user with said invitation based on said location of said second user.

23. The method of claim 22, further comprising providing an acceptance of said invitation from said second user to, or at location accessible by, said first user.

24. The computer based method of claim 23, further comprising allowing said first user to decide to approve or decline said acceptance from said second user.

25. The method of claim 20, wherein said invitation does not include a specified invited individual.

26. The method of claim 20, wherein said invitation includes a time or time range and a location for said meeting.

27. The computer based method of claim 20, wherein said online location is accessible via a computer network.

28. The computer based method of claim 20, wherein said online location accessible via the Internet.

29. The computer based method of claim 20, wherein said steps (a) and (b) are performed using one or more wireless computer devices.

30. The computer based method of claim 20, wherein said first user and/or said second user are anonymous users.

31. The computer based method of claim 20, wherein said first user and said second user do not know each other prior to using said method.

32. The computer based method of claim 20, wherein step (a) is performed using a computer device including a software program, recorded on computer readable medium, for controlling said computer device.

33. A method for enabling users to network with other users comprising:
    (a) allowing a first user to register and create a first user profile including public information and private information;
    (b) determining the location of a second user; and
    (c) providing a notification to, at an online location accessible by, said second user including updated information including an invitation from said first user for a meeting;
    wherein said steps (a), (b) and (c) are performed using one or more computer devices and said method results in said first user networking with said second user to arrange a meeting between said first user and second user.

34. The method of claim 33, wherein said location of said second user is determined using a cellular communication network.

35. The method of claim 33, wherein said location of said second user is determined using computer-implemented means for determining said location of said second user.

36. The method of claim 33, wherein said location of said second user is determined using an advanced positioning system in combination with a cellular communication network.

37. The method of claim 33, wherein said first user registers as an anonymous user.

38. The method of claim 33, further allowing said first user and said second user to communicate anonymously.

39. The method of claim 33, wherein said first user and said second user do not know each other prior to said meeting.

40. The method of claim 33, wherein said first user and said second user do not know each other prior to said first user registering.

41. The method of claim 33, wherein said first user and said second user do not know each other prior to said notification.

42. The method of claim 33, wherein said first user and said second do not know each other prior to said networking.

43. The method of claim 33, wherein said first user is charged a fee in step (a).

44. The method of claim 33, wherein said public information includes one or more of the following: profession; employer; city of employer; city of residence; place of birth; country of origin; education, college; graduate school; hobbies; age; favorite foods; or favorite cuisines.

45. The method of claim 33, wherein said private information includes one or more of the following: full name, home address, business address, telephone number, email address, and credit card number.

46. The method of claim 33, further receiving a travel itinerary from a user and allowing another user to provide said user with information based on said travel itinerary.

47. The method of claim 33, further comprising notifying a third user of said notification.

48. The method of claim 33, further comprising determining the location of a third user using an advanced positioning system in combination with a cellular communication network.

49. The method of claim 33, further comprising providing a directory of users that includes user information and allowing users to contact other users using said directory.

50. The method of claim 33, where said method uses a wireless system comprising one or more computer devices.

51. The method of claim 50, wherein said one or more computer devices use a software program adapted to perform said method.

52. A computer-based system for performing the method of claim 33, comprising one or more computer devices for: (a) allowing said first user to register and create said first user profile; (b) determining the location of said second user; and (c) providing said notification to, or at an online location accessible by, said second user including said updated information including said meeting invitations.

53. The computer based method of claim 33, wherein step (a) is performed using a computer device including a software program, recorded on computer readable medium, for controlling said computer device.

* * * * *

UNITED STATES PATENT AND TRADEMARK OFFICE
CERTIFICATE OF CORRECTION

| | | |
|---|---|---|
| PATENT NO. | : 7,716,285 B2 | Page 1 of 1 |
| APPLICATION NO. | : 12/286565 | |
| DATED | : May 11, 2010 | |
| INVENTOR(S) | : John Edward Boyd | |

It is certified that error appears in the above-identified patent and that said Letters Patent is hereby corrected as shown below:

In column 6, line 43, after "network" insert -- . --, therefor.

In column 23, line 46, in claim 33, delete "and" and insert -- and said --, therefor.

In column 24, line 14, in claim 42, delete "second" and insert -- second user --, therefor.

In column 24, line 20, in claim 44, delete "education," and insert -- education; --, therefor.

Signed and Sealed this
Eighth Day of November, 2011

David J. Kappos
*Director of the United States Patent and Trademark Office*